United States Patent [19]
Garrett

[11] Patent Number: 5,899,410
[45] Date of Patent: May 4, 1999

[54] AERODYNAMIC BODY HAVING COPLANAR JOINED WINGS

[75] Inventor: Timothy M. Garrett, Florissant, Mo.

[73] Assignee: McDonnell Douglas Corporation, St. Louis, Mo.

[21] Appl. No.: 08/764,201

[22] Filed: Dec. 13, 1996

[51] Int. Cl.[6] .............................. B64C 3/10; B64C 3/40
[52] U.S. Cl. ........................................ 244/45 R; 244/46
[58] Field of Search ............................. 244/45 R, 45 A, 244/46, 48, 49, 13, 15, 34 A; D12/333, 334

[56] References Cited

U.S. PATENT DOCUMENTS

| | | | |
|---|---|---|---|
| 3,834,654 | 9/1974 | Miranda | 244/45 R |
| 4,053,125 | 10/1977 | Ratony | 244/46 R |
| 4,106,727 | 8/1978 | Ortell | 244/49 |
| 4,336,913 | 6/1982 | Hall | 244/45 R |
| 4,364,531 | 12/1982 | Knoski | 244/49 X |
| 4,365,773 | 12/1982 | Walkovitch | 244/45 R |
| 4,453,426 | 6/1984 | Groutage et al. | |
| 4,856,736 | 8/1989 | Adkins et al. | 244/45 R |
| 4,896,846 | 6/1990 | Strom | |
| 5,046,684 | 9/1991 | Walkovitch | 244/45 R |
| 5,615,846 | 4/1997 | Schmoldas et al. | 244/49 X |
| 5,671,899 | 9/1997 | Nicholas et al. | 244/46 X |

OTHER PUBLICATIONS

Don Edberg, *Radio Control Modeler*, "Soaring", 1994, pp. 19, 21.

*Aerospace Daily*, "MDC's Phantom Works Develops 'Diamond' Concept," Jan. 23, 1995, pp. 104, 105.

David A. Fulghum, *Aviation Week & Space Technology*, "Industry Base Faces 20% Cut," Jan. 30, 1995, pp. 22, 23.

*Primary Examiner*—William Grant
*Attorney, Agent, or Firm*—Bell Seltzer Intellectual Property Law Group of Alston & Bird LLP

[57] ABSTRACT

The aerodynamic body, such as an aircraft, includes a lengthwise extending fuselage and a pair of coplanar joined wings extending outwardly from opposed sides of the fuselage. The pair of coplanar joined wings are formed by at least two forward wings extending laterally outward and rearward from opposite sides of a forward portion of the fuselage, and at least two aft wings extending laterally outward and forward from opposite sides of a rearward portion of the fuselage. Each aft wing is joined to a respective forward wing at a common wingtip to thereby form one of the joined wings. In particular, the aft wing can either be joined to the outermost portion of the respective forward wing or to a medial portion of the respective forward wing such that a portion of the forward wing extends outboard of the common wingtip. In either embodiment, the forward and aft wings of the joined wing aircraft define respective planes which are mutually coplanar such that the resulting coplanar joined wing aircraft has enhanced aerodynamic and structural properties.

7 Claims, 6 Drawing Sheets

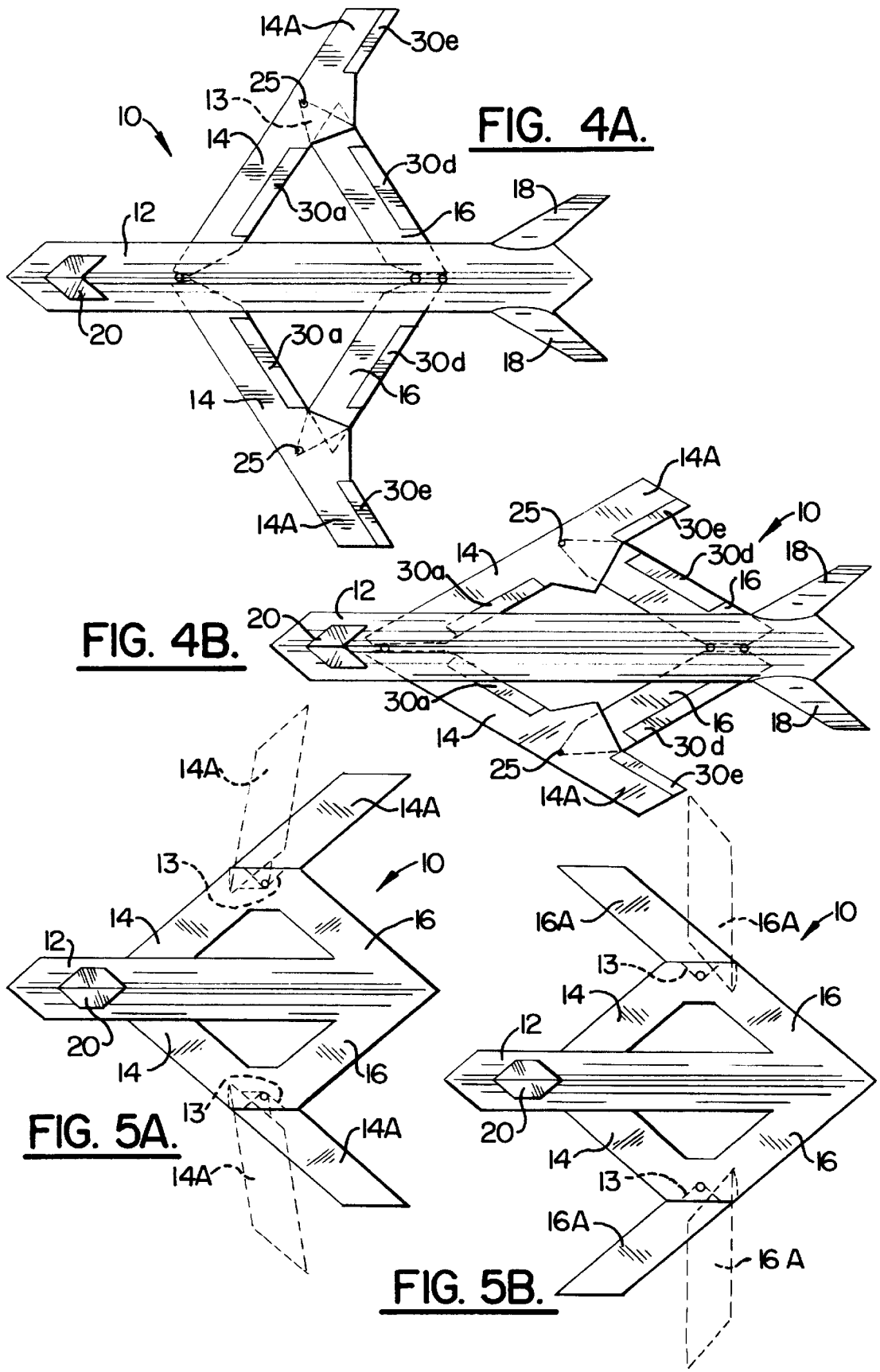

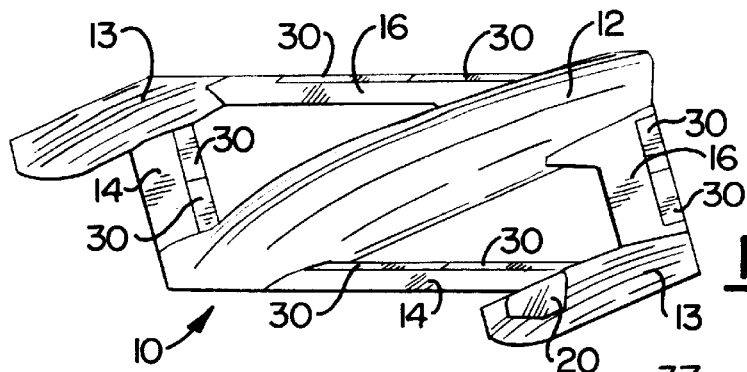
FIG. 6A.
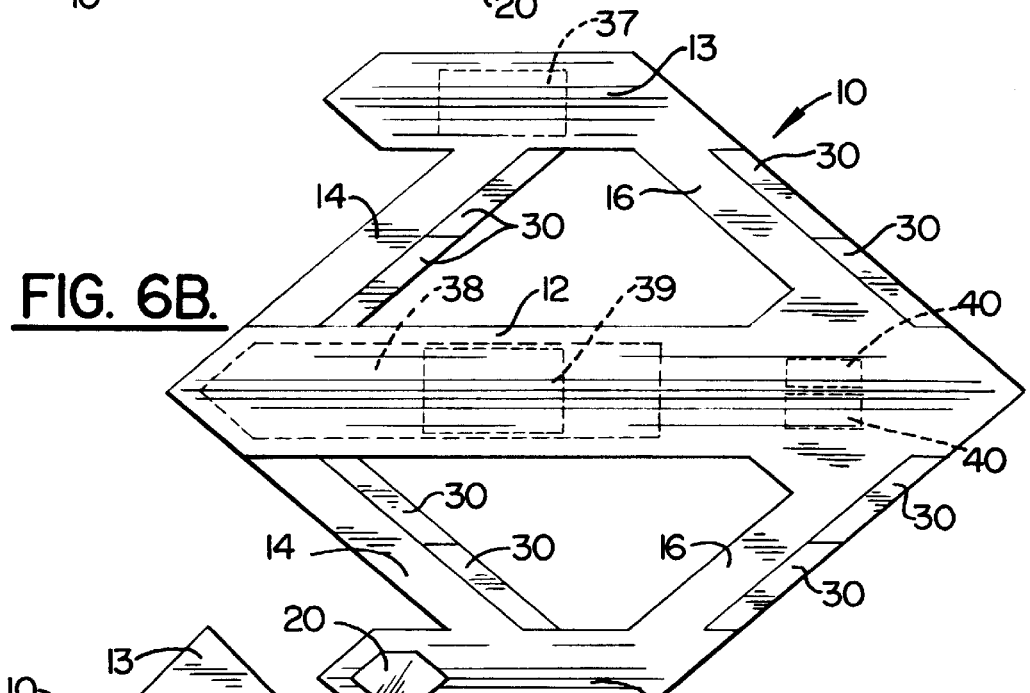
FIG. 6B.
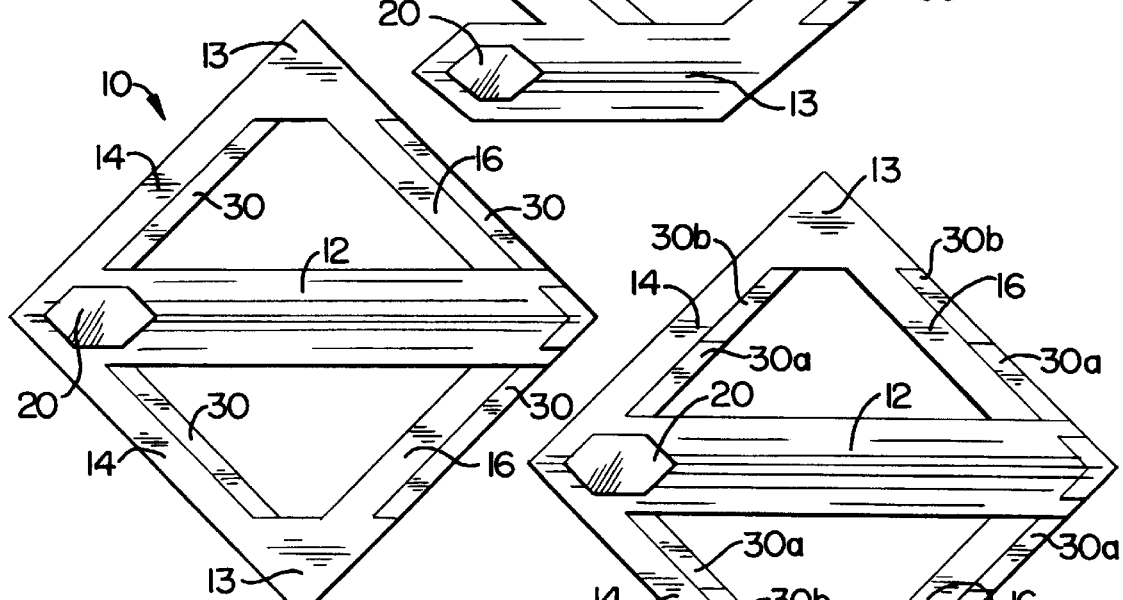
FIG. 7A.
FIG. 7B.

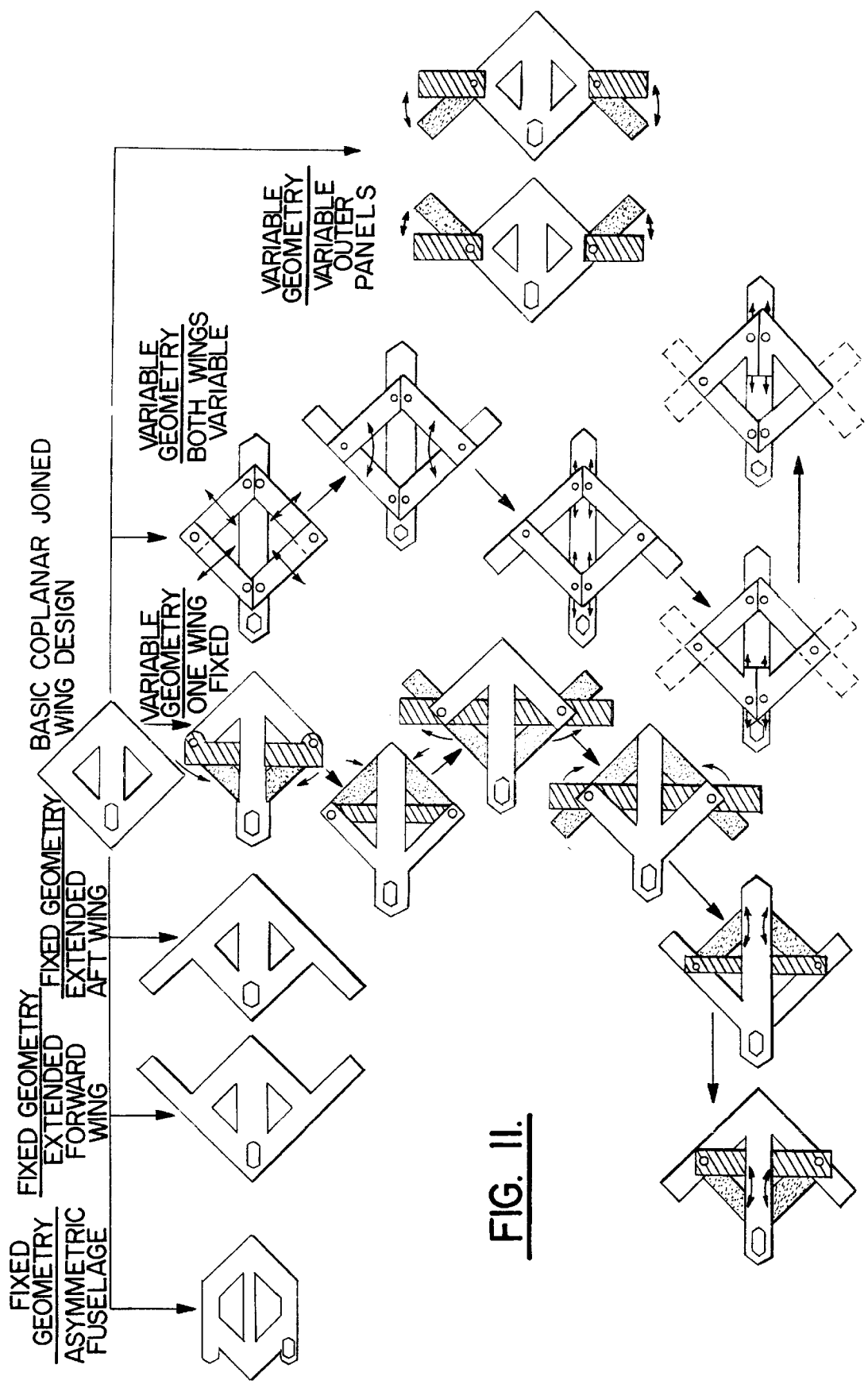
FIG. II.

AERODYNAMIC BODY HAVING COPLANAR JOINED WINGS

FIELD OF THE INVENTION

The present invention relates generally to aerodynamic bodies, such as aircraft, and, more particularly, to aircraft and other aerodynamic bodies having coplanar joined wings which improve their aerodynamic performance and allow improved internal arrangements.

BACKGROUND OF THE INVENTION

All successful aircraft designs must address numerous design parameters in order to provide the necessary lift and thrust to overcome the associated drag and weight of an aircraft so as to fly. For example, common design parameters which affect the aerodynamic efficiency or performance of an aircraft include the aspect ratio (AR), weight, the lift coefficient, the drag coefficient and stability factors (typically indicated by yawing, pitching, and rolling moments) both at high speed and low speed conditions.

The central challenge of aircraft design is to maximize the amount of lift generated by an aircraft for the amount of associated drag, i.e., maximize the lift to drag (L/D) ratio. Of course the shape of the aircraft's wings also impacts the distribution of aerodynamic pressure or force over the surface of the wings which, in turn, affects the rotational and structural capabilities and limitations of the resulting aircraft.

As set forth below, the AR is generally thought to be one of the more important aircraft design parameters and can be computed as follows:

$$AR = (\text{span})^2/\text{area}$$

wherein "span" is the distance from one wingtip to the other wingtip and "area" is the surface area of the wings. Higher aspect ratio wings are generally thought to be more aerodynamically efficient because they provide a better L/D ratio.

Another aircraft design parameter is the sweep angle of the wings which can be described as the angle between a line drawn a quarter of the way between the leading and trailing edge of a wing and the spanwise or lateral direction. Wings with lower sweep angles generally yield higher lift force components, while wings having greater sweep angles are typically more desirable at flight speeds close to the speed of sound in order delay the onset of undesirable compressibility effects.

In order to address the various aircraft design parameters, a number of different types of aircraft have been developed. In this regard, conventional aircraft can be generally divided into two categories—a cantilever wing type aircraft and a joined wing type aircraft. Prior joined wing aircraft configurations employ two sets of wings which are rigidly interconnected or joined. As a result, the joined wing structure is self-bracing. In contrast, a cantilever wing structure employs wings which have no self-bracing feature, but which, instead, extend laterally outward from the fuselage in a manner independent of the other wing. A cantilever wing structure must therefore have stronger supporting struts and, in some instances, requires thicker wings fabricated from stronger materials. In comparison to cantilever wing configurations, structurally speaking, joined wing aircraft can have lighter and stiffer wings. Further, joined wing aircraft can also have improved aerodynamic characteristics such as higher span-efficiency factors which result in lower induced drag.

While there are a number of prior patents describing joined wing aircraft, none of the patented aircraft have adequately addressed all of the various aircraft design parameters. For example, U.S. Pat. No. 5,046,684 issued to Wolkovitch entitled Airplane with Braced Wings and Pivoting Propulsion Devices describes an airplane having two sets of wings at different planar positions relative to each other. These offset wings sweep in opposite directions to meet and join at a tip area. The text of this reference is hereby incorporated as if recited in full herein.

In particular, the Wolkovitch '684 patent describes the use of a vertical tail to mount an aft wing higher than a forward wing, thus, forming a triangular braced wing configuration. The tail, while providing inherent stability to the aircraft, must be of fairly rugged construction in order to carry the entire aft wing loads as well as its own load. As a result, the tail would likely be sized thicker than the aerodynamically optimum tail, potentially resulting in a tail-heavy condition. Further, the increased drag introduced by this non-coplanar wing configuration also reduces the L/D ratio.

The triangular braced wing configuration proposed by the Wolkovitch '684 patent is also configured such that the large forward wing and aft wing dihedral creates a significant amount of wing area when viewed from the side of the aircraft. The dihedral angle is the angle between the plane of the wing and the horizontal plane as seen in the front view.

Notably, any side projected area of the wings forward of the center of gravity is directionally destabilizing, although it is at least partially counter-balanced by the side projected area of the aft wing which is stabilizing (like the vertical tail). Thus, the side projected area of both wings does not provide any aerodynamic benefit and would most likely add to the aircraft's drag without increasing its lift.

U.S. Pat. No. 4,365,773 also issued to Wolkovitch entitled Joined Wing Aircraft also describes a joined wing aircraft which employs a tail and a pair of wings. The first set of wings extend outwardly in opposite directions from a medial portion of the fuselage to join the ends of respective ones of a second set of wings which are mounted to the top of the tail and extend downwardly and forward therefrom. Again, the wings are positioned at different planar levels and require the tail to support the aft wings, thereby creating a heavier vertical tail and aft body. Thus, even though a variety of joined wing aircraft have been designed in an attempt to optimize one or more of the various aircraft design parameters, each of these joined wing aircraft designs still suffers from several deficiencies which limit the aircraft's performance capabilities.

SUMMARY OF THE INVENTION

It is therefore an object of the present invention to provide an improved aerodynamic body, such as an improved aircraft, with enhanced aerodynamic properties.

It is another object of the present invention to provide an improved aerodynamic body, such as an improved aircraft, having enhanced structural characteristics.

These and other objects are provided, according to the present invention, by an aerodynamic body, such as an aircraft, which includes a lengthwise extending fuselage and a pair of coplanar joined wings extending outwardly from opposed sides of the fuselage. The pair of coplanar joined wings are formed by at least two forward wings extending laterally outward and rearward from opposite sides of a forward portion of the fuselage, and at least two aft wings extending laterally outward and forward from opposite sides of a rearward portion of the fuselage. Each aft wing is joined to a respective forward wing at a common wingtip to thereby form one of the joined wings. In particular, the aft wing can either be joined to the outermost portion of the respective forward wing or to a medial portion of the respective forward wing such that a portion of the forward wing extends outboard of the common wingtip or vice versa. In either embodiment, the forward and aft wings of the joined wing aircraft of the present invention define respective planes which are mutually coplanar such that the resulting coplanar joined wing aircraft has enhanced aerodynamic and structural properties.

In order to further improve the performance of the aircraft of the present invention, the aircraft is designed such that expendable objects, such as fuel, and heavier objects, such as air-to-ground weapons, can be carried at or near the center of gravity of the aircraft, while objects with a fixed weight or lighter objects can be removed from the center of gravity of the aircraft. For example, according to one embodiment, the aircraft includes a crew station which typically has a fixed weight and which is positioned away from the center of gravity of the aircraft and within at least one common wingtip. Likewise, an aircraft according to another embodiment of the present invention can define an internal weapons bay within a common wingtip, such as the common wingtip opposite the crew station, for storing weapons, such as relatively lightweight air-to-air weapons, prior to delivery of the weapons during flight of the aircraft. In contrast, the aircraft can include a fuel tank disposed within the fuselage and surrounding the center of gravity such that the center of gravity of the aircraft will not significantly shift and the aircraft's performance will not be altered as the fuel is expended during the flight of the aircraft. The aircraft can also include landing gear, including centerline landing gear which extends downwardly from the fuselage and outrigger landing gear which extends downwardly from respective ones of the common wingtips.

The aerodynamic body, such as an aircraft, of one advantageous embodiment has variable wing sweep in order to further improve its aerodynamic performance. According to one embodiment, one wing of each coplanar joined wing is fixed in position relative to the fuselage while the other wing is adjustably joined to the fuselage such that the sweep angle defined by the adjustable wing can be controllably varied. Alternatively, both the forward and aft wings of a coplanar joined wing can be adjustably connected to the fuselage such that the entire joined wing can be extended and can be closed in a scissors-like motion to provide variable wing sweep. According to either embodiment, however, the adjustable connection of one or both wings of the coplanar joined wing to the fuselage generally includes a sliding-type connection such that relative position of the fuselage and the adjustable wing(s) can be adjusted by sliding the wing(s) forward and rearward.

According to one embodiment, the aerodynamic body of the present invention, such as an aircraft, includes at least two wing panels extending outward from the respective ones of the common wingtips. While the wing panels can be integral with and extend outwardly from a respective forward wing, the wing panels can also be adjustably connected to the respective common wingtip such that the sweep angle defined by each wing panel can be controllably varied to provide the variable wing sweep. For example, each wing panel can be controllably rotated within the plane defined by the forward and aft wings of the coplanar joined wing to thereby selectively vary the sweep angle. In addition, each wing panel can be provided in a wing-fold configuration, for example, each wing panel can be hingedly connected to the respective common wingtip such that the wing panel can be controllably rotated in an upward direction to a stowed position to facilitate storage of the aerodynamic body.

Therefore, the aerodynamic body, such as the aircraft, of the present invention preferably includes coplanar joined wings which provide significant aerodynamic and structural advantages. According to one particularly advantageous aspect of the present invention, the coplanar joined wings can be positionally varied to provide variable wing sweep, thereby further improving the aerodynamic performance of the aircraft at different operating conditions, such as during takeoff, flight and landing. In addition, the aircraft of the present invention allows fixed weight and lighter weight objects, such as a crew station and lighter weapons, to be disposed in the common wingtips of the coplanar joined wings such that heavier items and expendable items, such as fuel, can be disposed at or near the center of gravity of the aircraft, thereby insuring that the aerodynamic performance of the aircraft will not change or degrade as the expendable items are consumed during flight.

BRIEF DESCRIPTION OF THE DRAWINGS

FIG. 2 illustrates a plan view of a tailless coplanar joined wing aircraft including multiple control surfaces according to.

FIGS. 4A and 4B illustrate one embodiment of the coplanar joined wing aircraft of the present invention in which the coplanar joined wings have a variable sweep option for both wings and define a relatively small sweep angle and a relatively large sweep angle, respectively.

FIGS. 5A and 5B are schematic plan views of one embodiment of the coplanar joined wing aircraft of the present invention which illustrate wing panels having variable sweep outer panels which extend outwardly from the common wingtips.

FIGS. 6A and 6B are perspective and schematic cross-sectional plan views, respectively, of one embodiment of the coplanar joined wing aircraft of the present invention which includes a crew station and a weapons bay in the common wingtips.

FIGS. 7A and 7B are schematic plan views of one embodiment of the coplanar joined wing aircraft of the present invention which illustrate control surfaces on the trailing edges of the forward and aft wings.

FIG. 11 is a schematic diagram illustrating a coplanar joined wing family tree which illustrates some of the fixed and variable wing configurations.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
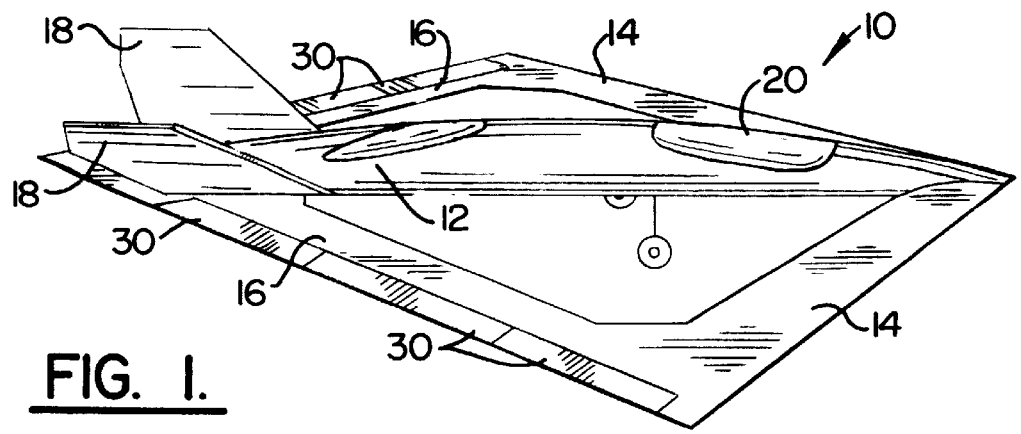
FIG. 1 illustrates a perspective view of a coplanar joined wing aircraft.
Figure 2:
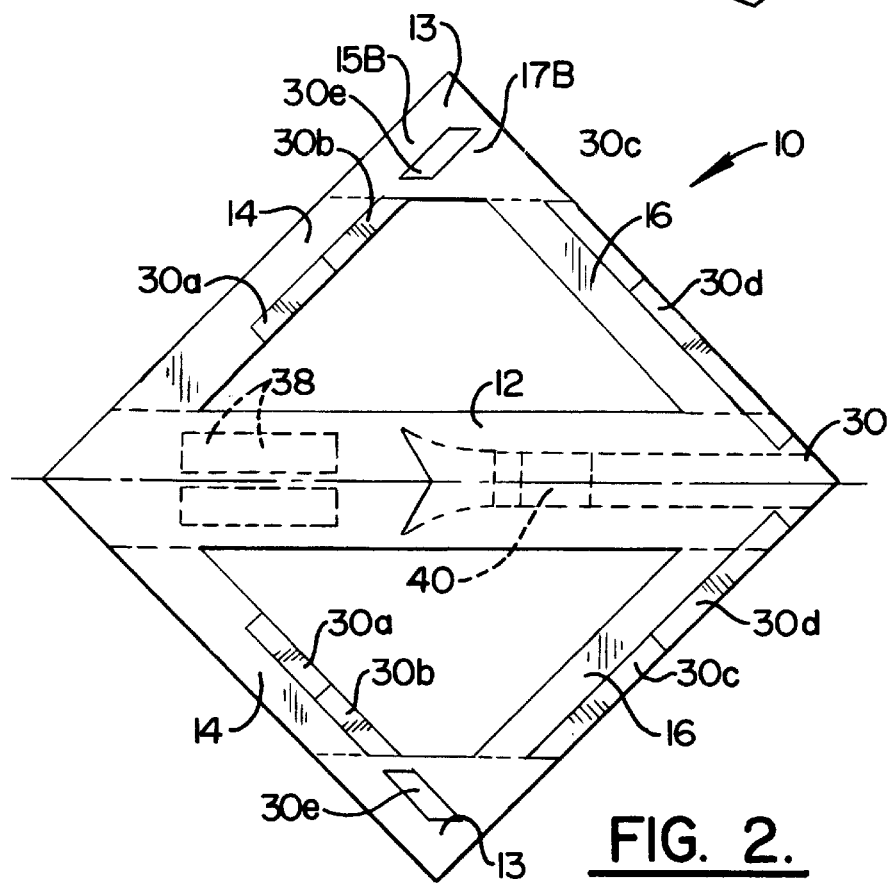

FIG. 1 illustrates a joined wing aircraft 10. While the present invention will be described primarily in conjunction with aircraft, such as airplanes, the present invention is equally applicable to a number of different aerodynamic bodies, such as missiles as shown in FIGS. 9 and 10 and described hereinafter. As illustrated in FIGS. 1 and 2, however, a joined wing aircraft includes a lengthwise extending fuselage 12, forward wings 14 which are preferably aft swept and aft wings 16 which are preferably forward swept. The wings are attached to the fuselage at their respective wingroots.

Figure 3:
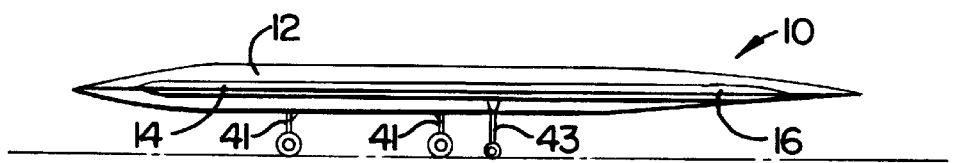
FIG. 3 illustrates a side view of the embodiment of the coplanar joined wing aircraft illustrated in FIG. 2.

The aft wings 16 are positioned aft of the forward wings 14, but on substantially the same planar level relative to the forward wings. In particular, each of the wings is relatively flat when viewed from the side as shown in FIG. 3. As such, each wing defines a respective planar surface which extends through the leading and trailing edges of the wing and which is mutually coplanar with the planar surfaces defined by each of the other wings.

As illustrated, the forward wing 14 and aft wing 16 on each side of the fuselage 12 are each angled or swept, at either the same or different angles, to extend toward the other and to join at a common wingtip 13, thereby forming a coplanar joined wing on each side of the fuselage. The outermost portions 15B, 17B of the forward and aft wings are joined in the embodiment of FIGS. 1–3. However, the structure can also include an additional wing panel 14A, 16A positioned at a common wing tip 13 to extend therebeyond. The extra panel 14A, 16A can be positioned at a number of locations so that it is aligned with aft wing forward wing or variable sweep. See e.g. configurations noted in FIG. 11. FIG. 11 illustrates some of the alternative wing configurations and illustrates wings or wing portions which have been both speckled and cross-hatched to show some alternative wing positions. For example, under the variable geometry heading with one wing fixed configuration, one of the forward or aft wing is stationary or fixed (indicated as white) and the other wing is moveable between a first position (indicated as shaded or speckled pattern) and a second position (indicated by a cross-hatch pattern).

In the embodiment of FIGS. 4A and 4B, for example, the aircraft 10 includes an additional wing panel 14A which extends beyond or outboard of the common wingtip 13. The attachment can be either fixed or variable thus providing a fixed wing geometry or a variable sweep wing geometry.

As shown in FIGS. 4A and 4B (and FIG. 11), the additional wing panel 14A can be integral with a common wing tip 13 and extend at the same angle as respective ones of the forward wing 14 or the aft wing 16. Alternatively, the wing panels 14A can be joined, typically in an adjustable manner, to a common wingtip 13 as shown in FIGS. 5A and 5B (FIG. 11). For example, the wing panels 14A, 16A can be rotatably connected to the common wingtip such that the wing panels can be rotated within the plane defined by the forward and aft wings to vary sweep angle of the wing panels as shown by the dashed lines in FIGS. 5A and 5B. Typically, the sweep angle of the wing panels is selectively controlled during flight, such as by a flight control computer which operates either automatically or based on pilot input, in order to optimize the aerodynamic performance of the aircraft for different flight conditions. In addition to rotating in the plane defined by the forward and aft wings, the wing panels can be hingedly connected to the respective common wingtips such that the wing panels can be rotated upwardly to a stowed position following flight to facilitate storage of the aircraft. Examples of known wing panel connections which would secure the wing panel to the common wingtip as in FIG. 5 includes a pin and bearing arrangement similar to those employed on B-1, F-111, or Soviet aircraft. One of skill in the art would appreciate that the wing panels could be rotated in any number of manners such as via a linear or rotary actuator.

As known to those skilled in the art, the location of the center of gravity (Cg) of an aircraft is an important factor in aircraft stability since the various forces and moments of the aircraft must be balanced about the Cg in order for an aircraft to be stable. Conventionally, however, the stability of an aircraft was hindered by changes in the location of the Cg during flight as bombs are released and fuel is consumed. In order to provide enhanced stability and operational efficiency, the aircraft 10 of the present invention is designed such that the Cg is within the fuselage 12 and expendable items and relatively heavy objects are located near the Cg, while lighter and fixed-weight items are mounted or disposed outboard of the fuselage, such as within the common wingtips 13.

For example, the aircraft 10 includes a crew station 20 for housing the crew of the aircraft. The crew station can resemble the cockpit of a conventional aircraft which includes the controls and other monitors necessary to guide the aircraft. While the crew station can be disposed within the fuselage 12 as shown in FIGS. 1–5, the crew station of one advantageous embodiment is preferably disposed within a common wingtip 13 or an extension of the common wingtip as shown in FIGS. 6A and 6B. As a result, the fixed-weight crew station is moved away from the Cg of the aircraft such that heavier items or expendable items can fill the fuselage. Although an aircraft having a crew station which is off center as shown in FIGS. 6A and 6B appears unusual, the aircraft and, more particularly, the flight control computer and the control surfaces can be readily configured such that the aircraft responds to the pilot's commands in a conventional fashion, such as by rolling about the crew station as opposed to the Cg of the aircraft, if desired.

As also shown in FIG. 6B, the fuselage 12 of this embodiment can include a fuel tank 38 for storing the fuel which will be consumed during the flight of the aircraft 10. Preferably, the fuel tank is disposed such that the Cg is near or within the fuel tank. As a result, the consumption of fuel during the flight and the resulting decrease in weight of the aircraft will not alter the stability characteristics of the aircraft since the Cg will not change as fuel is consumed. In addition, the fuselage can include a weapons bay 39 for storing relatively heavy weapons, such as air-to-surface missiles, and/or bombs, near the Cg such that the stability of the aircraft will not be significantly affected as these heavier weapons are deployed.

Since the common wingtips 13 of the aircraft 10 of the present invention can be larger than conventional wingtips, lighter weapons, such as air-to-air missiles, will fit within and can be stored within an outboard weapons bay 37 which is defined in one of the common wingtips, such as the wingtip opposite the crew station 20. Since these weapons are much lighter, however, they can be held within and deployed from a weapons bay remote from the Cg without significantly altering the flight characteristics of the aircraft.

As will be appreciated by those of skill in the art, these lighter missiles can be conveniently mounted on a launch rail attached to a weapons bay door. Thus, when the door is opened, the missiles are rotated into the air stream and released.

The aircraft 10 of the present invention also includes at least one propulsion engine 40. Although the engine could be mounted in a number of positions, the engine is preferably mounted aft of and central to the aircraft to further balance the craft. As is known in the art, the propulsion engine can include, but is not limited to, abducted fan or a turbofan. The aircraft also includes landing gear and, more preferably, includes a tandem centerline landing gear 41, such as employed by the B-52, U2, and AV-8 Harrier aircraft, which extends downwardly from the fuselage 12 and an outrigger landing gear 43 which extends downwardly from the common wingtips 13. During flight, the outrigger landing gear can be retracted into and housed within the common wingtips.

Because the vertical tail is typically sized to counteract low speed conditions such as in instances in which an engine is out, the inherent stability provided by a tail can become a liability during agile flight maneuvers. Although the aircraft 10 can include a tail 18 as shown in FIG. 1, it is preferred that the coplanar joined wing aircraft be configured without a rear vertical tail, i.e., vertically tailless, as shown in FIGS. 2 and 3. The tailless design yields an improvement in drag and weight. If desired, however, the aircraft can include a small tail fin(s) to provide a stabilizing effect without introducing large amounts of drag and weight. In any event, it is desired to minimize or replace the tail with other means to stabilize yawing moments. Exemplary methods for achieving this result include, but are not limited to, thrust vectoring or other aerodynamic features such as drag devices extending from the common wingtips 13 (FIG. 2) and the like.

The coplanar joined wing aircraft 10 of the present invention can provide directional stability in a variety of manners such as one or more vertical tails 18 which can include respective rudders, drag rudders and/or thrust vectoring. In particular, the coplanar joined wing aircraft can include a single centerline tail or two laterally spaced tails. Although the tail can be of different sizes, it is preferred that the tail(s) be relatively small to reduce the drag and weight of the aircraft. In addition to, or as an alterative to a tail, the coplanar joined wing aircraft can include drag rudders 30e (FIG. 2) including, but not limited to, split control surfaces such as that employed on the B-2 Bomber aircraft, blade spoilers typical of sailplanes, and spoiler/control surface combinations such as employed on the A-12 vertical tailless attack aircraft. In addition, thrust vectoring alone or in combination with other control surfaces can be used to generate an altered thrust vector to balance a yawing moment, thereby creating a controlled and stabilized force.

The aircraft 10 of the present invention preferably includes control surfaces 30, such as ailerons, elevators and rudders, which operate under control of the flight control computer to control various directional movements. As known to those skilled in the art, the angle of attack (and therefore speed) is typically controlled by elevators or elevons. These control surfaces wing will direct the angle of attack of an aircraft, in accordance with their position relative to the forward or aft wing. For example, assuming the control surfaces are positioned on forward wings 14, deflecting these control surfaces downward increases the lift of the wing and causes the nose of the aircraft to pitch upward, while an upward deflection yields the opposite effect. For control surfaces positioned on aft wings 16, the reverse is true.

As also known to those skilled on the art, lateral control of an aircraft is typically achieved by the differential deployment of the ailerons. For example, one aileron can be deflected downwardly to increase wing lift on the same side as the aileron, while another aileron, positioned on the opposing wing, can be deflected upwardly to reduce lift on that side. These effects combine to produce a rolling moment that tilts the wing and, in turn, rolls the airplane. Alternatively, the aircraft can include spoilers which project upwardly from the wing in lieu of or in addition to ailerons to produce separation and drag that, in turn, reduces lift.

Referring now to FIGS. 7A and 7B, a coplanar joined wing aircraft 10 of the present invention can include pitch and roll control surfaces 30 positioned on the trailing edges of the forward wings 14 alone, the aft wings 16 alone, or both. In addition, as illustrated by FIG. 7A, each wing can include a single control surface which is deflected in combination with the other control surfaces upon command by the flight control computer to function either as an elevator (moving together) or as an aileron (moving differentially).

As shown in FIG. 7B, however, each forward wing 14 can include a pair of control surfaces 30 to thereby form an inboard set 30a and an outboard set 30b. Likewise, each aft wing 16 can include a pair of control surfaces 30 to thereby form an inboard set 30d and an outboard set 30c. Based upon the deployment of these control surfaces, the aircraft 10 can be controlled in at least two different fashions. For example, the inboard set of control surfaces 30a, 30d on both the forward and the aft wings 14, 16 can be deployed as elevators and the outboard set on both wings 30b, 30c can be deployed differentially as ailerons. Conversely, the outboard set 30b, 30c on both wings can operate as elevators, while the inboard set 30a, 30d on both wings can operate as ailerons. Of course, the control surfaces 30 can be activated or deployed, such as by the flight control computer, in different manners to thereby intermix the functions of both pitch and roll among the various control surfaces. This flexibility enhances an aircraft's survivability by providing redundant control.

Advantageously, the aircraft 10 of the present invention deploys the intermixed control surfaces 30 (e.g., FIGS. 4, and 6) to provide a high lift configuration. For example, selected ones of both forward and aft wing control surfaces 30 can be deflected downwardly for landing, while other selected surfaces can be deflected upwardly to control the roll and/or pitch of the aircraft. In addition, based upon the configuration of the coplanar joined wing aircraft of the present invention, the various control surfaces can be trimmed to provide high lift, while generating balanced moments on the forward and aft wings. Therefore, the coplanar joined wing aircraft of the present invention suffers from relatively little, if any, loss of lift compared to the much greater loss associated with conventional wing/tail systems, thereby producing a higher trimmed lift coefficient. Further, it will be appreciated by those of skill in the art that a non-coplanar joined wing's dihedrals yields lift which is normal to the plane of the wing and results in a corresponding loss in high lift.

It is also preferred, especially for aircraft with high speed applications, that the aircraft has a variable geometry to provide both an optimum subsonic and supersonic wing sweep. This variable wing sweep feature allows the L/D ratio to be adjusted to provide good cruise efficiency at both speed conditions. For example, an unswept configuration is generally best for low speed conditions, such as take off, and a swept wing configuration is generally best for high speed conditions. Advantageously, this feature allows for increased range, better STOL characteristics and better maneuvering capabilities at higher speeds.

A coplanar joined wing aircraft 10 of the present invention can incorporate variable sweep in a variety of manners, such as by changing the sweep of only one wing while keeping the other wing fixed or by changing the sweep of both wings either independently or in the same manner. Additionally, the sweep angle of only a portion of the wings can be altered, such as the sweep angle defined by a wing panel 14A, 16A positioned outboard of the common wingtip 13 as described above.

In the embodiment of the present invention in which the sweep of both the forward and aft wings can be varied, the forward and aft wings are joined to the fuselage 12 in an adjustable manner such that the sweep angle defined by each of the wings can be controllably altered. For example, FIG. 4A shows an unswept configuration, while FIG. 4B shows a swept configuration. The wings can have a variety of shapes and sizes and can be positioned so as to have a variety of sweep angles. In addition, while the embodiment of FIGS. 4A and 4B depicts the aft wing 16 joined to a medial portion of the forward wing 14 to form a common wingtip 13 which is inboard of the wing edge, the aft and forward wings can be joined at their respective wingtips as shown in FIG. 1 without departing from the spirit and scope of the present invention.

The coplanar joined wing aircraft 10 of this embodiment includes a scissor mechanism which operates under control of the pilot and/or flight control computer to controllably position the forward and aft wings. In one embodiment, the forward wings 14 are rotatably connected to the fuselage 12 so as to rotate about a pivot point while the aft wings 16 are slidably connected to the fuselage. Therefore, the relative position at which the aft wings extend outwardly from the fuselage can be readily adjusted by controllably sliding the aft wings either forward or rearward relative to the fuselage. Since the aft wings are adjustably joined to respective ones of the forward wings at pivot points, the movement of the aft wings forward and rearward relative to the fuselage not only alters the sweep angle of the aft wings, but also moves the forward wings in the same direction so as to correspondingly alter the sweep angle defined by the forward wings. For example, by sliding the aft wings forward, the forward and aft wings can be extended in a low swept condition. Alternatively, by sliding the aft wings rearward relative to the fuselage, the forward and aft wings can be closed into a higher swept condition. In fact, in some embodiments in which the aerodynamic body is a missile as shown in FIGS. 9 and 10, the forward and aft wings 14, 16 can be closed within the fuselage to facilitate internal storage and or a low drag external carriage.

Although the forward wings 14 can be rotatably connected to the fuselage 12 so as to rotate about respective pivot points as the aft wings 16 slide forward and rearward, the scissor mechanism can be implemented in the variety of other fashions to allow the sweep angle of the forward and/or aft wings to be varied without departing from the spirit and scope of the present invention. For example, the aft wings can be rotatably connected to the fuselage so as to rotate about a pivot point, while the forward wings can be slidably connected to the fuselage such that the forward wings can slide forward and rearward in order to decrease the sweep angle and increase the sweep angle, respectively.

Alternatively, both the forward and aft wings can be slidably connected to the fuselage 12 such that both the forward and aft wings can slide forward and rearward relative to the fuselage as shown in FIGS. 4A and 4B. For example, in order to place the wings in a low swept condition as shown in FIG. 4A, the forward wings 14 could slide rearward while the aft wings 16 could slide forward. Alternatively, to place the wings in a highly swept condition as shown in FIG. 4B, the forward wings could slide forward and the aft wings could slide rearward. As described above, the forward and aft wings of each coplanar joined wing are rotatably connected at a pivot point 25 such that the forward and aft wings remain joined at the common wingtip 13 as the relative positions of the forward and aft wings change.

While the sliding connection between the forward and/or aft wings and the fuselage 12 can be provided in a variety of fashions without departing from the spirit and scope of the present invention, one acceptable connection, as illustrated in FIGS. 9 and 10, is a tracked wing carry-through 83 structure or box with integral bearings connected to the spars of the respective wings. The wing carry-through box 83 can be activated by a linear actuator such as a jackscrew.

Figure 8A:
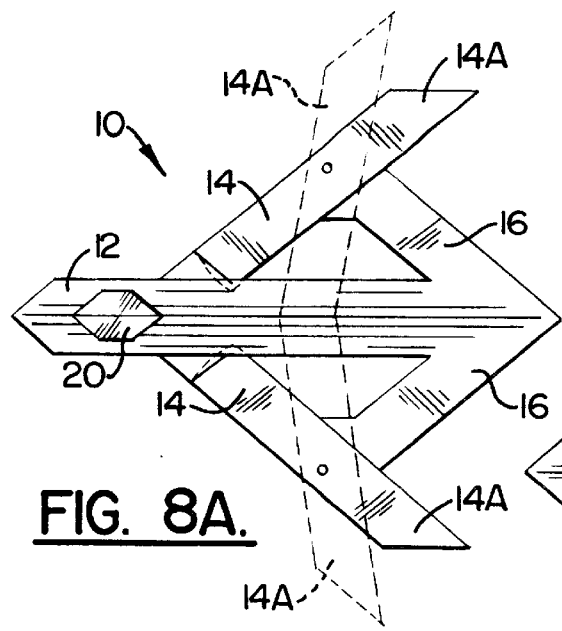
FIGS. 8A and 8B are schematic plan views of one embodiment of the coplanar joined wing aircraft of the present invention which illustrate movement of either the forward wings alone or the aft wings alone in order to vary the corresponding sweep angle.
Figure 8B:
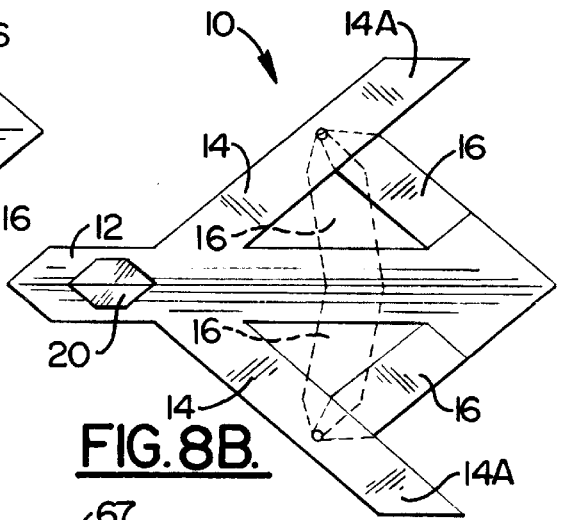

As shown in FIGS. 8A and 8B, the coplanar joined wing aircraft 10 of the present invention can provide variable wing sweep even if one set of the wings, such as the forward wings 14 or the aft wings 16, are fixed in position. Referring to FIG. 8A, for example, the aft wings are fixed in position and the forward wings are slidably connected to the fuselage 12. Thus, by sliding the forward wings rearward as shown by the dashed lines, the forward wings are placed in an unswept position, while by sliding the forward wings forward as shown by the solid lines, the forward wings are placed in a swept condition. Alternatively, the forward wings can be fixed in position and the aft wings can be slidably connected to the fuselage as shown in FIG. 8B. Thus, by sliding the aft wings forward and rearward relative to the fuselage, the sweep angle of the aft wings can be decreased and increased, respectively. In either embodiment, however, the wings are typically moved or deployed under control of the flight control computer as described above.

As shown in FIGS. 8A and 8B, the forward and aft wings 14, 16 are preferably adjustably connected such that the forward and aft wings remain joined as the relative positions of the wings are varied. For example, the forward and aft wings can be connected by means of a pin and bearing mounted to their respective spars as described above.

The aerodynamic body of the instant invention can also include wings configured to provide a wingfold to facilitate storage of the aerodynamic body. The wingfold can be positioned at either the wingroot or at a common wingtip. Thus, it will be appreciated by those of skill in the art that if the wingfold is positioned at the wingroot, the wing will be hingeably connected to the fuselage, thereby allowing the wing to be rotated upward for storage. Similarly, if the wingfold is positioned at the common wingtip, the outboard panel will be hingeably connected to the wing, thereby allowing the panel to be rotated upward for storage.

Figure 9A:
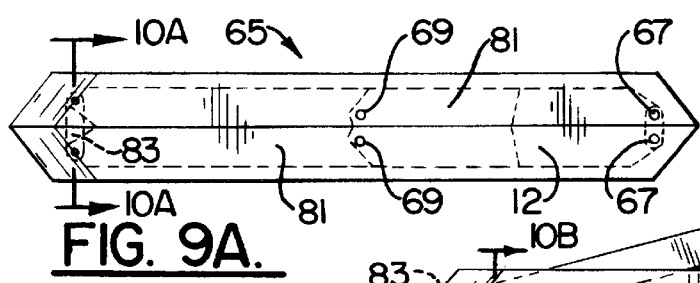
FIGS. 9A–9C are plan views of one embodiment of a coplanar joined wing missile of the present invention which illustrates the coplanar joined wings in the stowed, partially deployed and fully deployed positions, respectively.
Figure 9B:
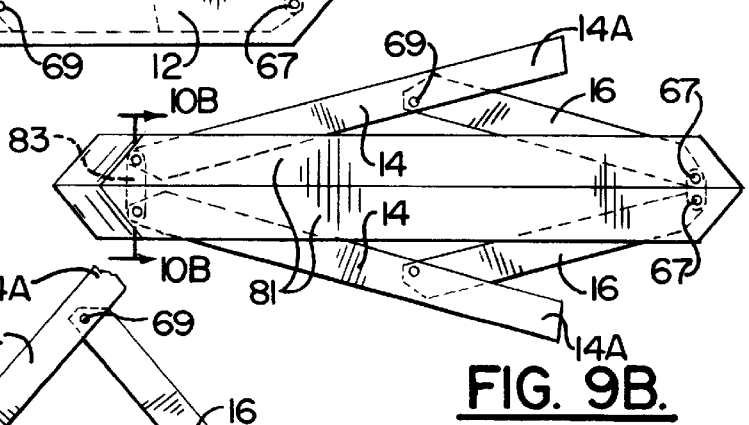
Figure 9C:
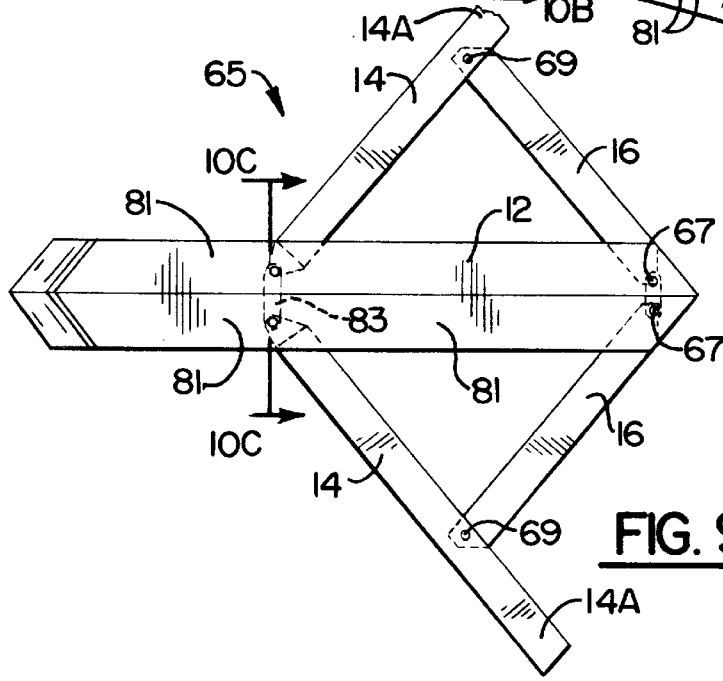
Figure 10A:
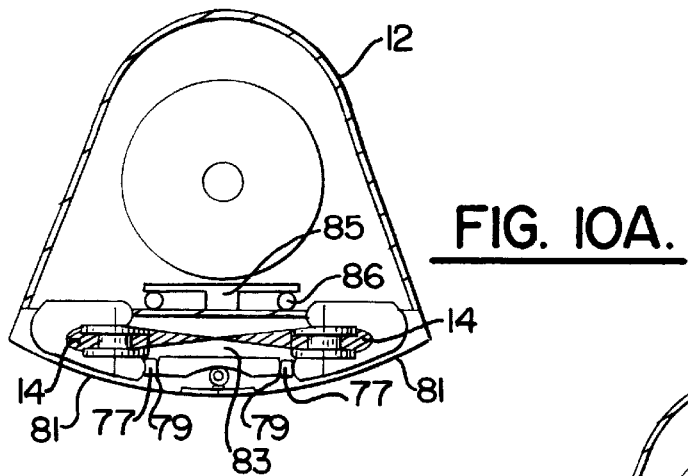
FIGS. 10A–10C are cross-sectional views taken along line 10—10 of FIGS. 9A–9C, respectively, which illustrate the adjustable connection between the forward wings and the fuselage of the coplanar joined wing missile of one embodiment of the present invention.

Another embodiment of the present invention is illustrated in plan view in FIG. 9 and in cross-section in FIG. 10. In this embodiment, the aerodynamic body is a missile 65, such as a cruise missile, which employs a coplanar joined wing configuration as shown for increased aerodynamic efficiency including longer range, lower profile, better maneuvering and less wing structural weight. Typically, cruise missiles incorporate folding fins and/or wings to allow the missile to be carried either under wing or in the weapons bay of an aircraft. Thus, the joined wings can be folded into the fuselage 12 of the missile of the present invention as shown in FIGS. 9A and 10A in order to permit compact storage prior to deployment.

Figure 10B:
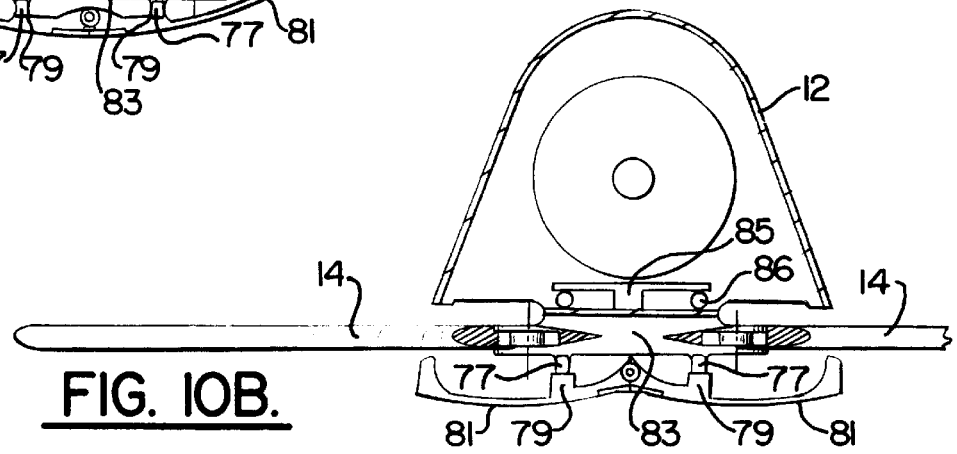
Figure 10C:
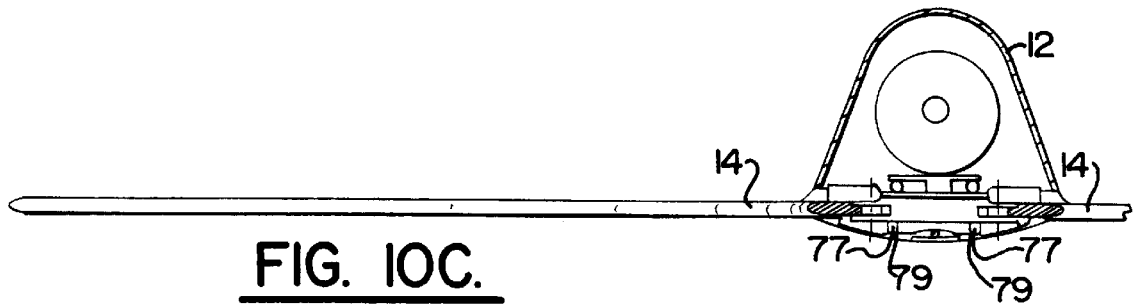

According to the present invention, the missile 65 can controllably alter the sweep of the wings to optimize the mission profile. In operation, initially wings are folded, then during the next phase of the mission when the missile is heavy due to the full load of fuel, the wings can be deployed to provide less wing sweep as shown in FIGS. 9C, 10C. Then, as fuel is burned and the missile becomes lighter, the wings can be deployed to provide more wing sweep to achieve a higher inbound speed to the target destination as shown in FIGS. 9B and 10B. Additionally, if a "pop-up" maneuver is desired, the wings can be deployed to provide additional wing sweep to increase climb performance. Then, at the top of the trajectory when the missile is on the verge of diving on the target, the wings can be restowed for minimum drag and maximum impact velocity.

As described above in conjunction with the aircraft 10 of FIGS. 4, 8, and 9 the wings are adapted to be extended and retracted by sliding either the forward wings 14 or the aft wings 16 or both relative to the fuselage 12. For example, the aft wings can be rotatably connected, such as with pins 67 and 69, to both the fuselage and the respective forward wing. In addition, the forward wings can be slidably connected to the fuselage, such as via an integral track/roller mechanism, such that the integral rollers 77 can slide over cam tracks 79 integral with the fuselage covers 81 to deploy and retract the fuselage covers allowing the wing to extend or retract.

As shown in FIG. 10, rollers and associated cam tracks 77, 79 respectively, open and close the wing covers 81. The wing track and associated rollers 85, 86 slide the wing 14 aft. The mechanism is housed in a wing box carry through 83 under or on the bottom of the fuselage 12. However, it will be apparent to one skilled in the art that the forward and aft wings can be slidably connected to the fuselage in a variety of other manners without departing from the spirit and scope of the present invention.

Although the joined wings of each of the above-described embodiments have been swept or moved in a similar manner in the attached drawings, the joined wings can be deployed such that the joined wings have different sweep angles, i.e., are swept differentially. The resulting asymmetric lift can provide roll stability and control instead of or in addition to ailerons. In contrast, symmetric sweeping of the wings can provide pitch stability and control.

Therefore, the aerodynamic body, such as the aircraft 10, of the present invention preferably includes coplanar joined wings which provide significant aerodynamic and structural advantages. According to one particularly advantageous aspect of the present invention, the coplanar joined wings can be positionally varied to provide variable wing sweep, thereby further improving the aerodynamic performance of the aircraft at different operating conditions, such as during takeoff, flight and landing. In addition, the aircraft of the present invention allows fixed weight and lighter weight objects, such as a crew station 20 and lighter weapons 37, to be disposed in the common wingtips 13 of the coplanar joined wings such that heavier items and expendable items, such as fuel, can be disposed at or near the center of gravity of the aircraft, thereby insuring that the aerodynamic stability and performance of the aircraft will not change or degrade as the expendable items are used during flight.

In the drawings and the specification, there has been set forth preferred embodiments of the invention and, although specific terms are employed, the terms are used in a generic and descriptive sense only and not for the purpose of limitation, the scope of the invention being set forth in the following claims.

That which is claimed is:

1. An aerodynamic body having variable wing sweep comprising:

a lengthwise extending fuselage having a forward portion and a rearward portion;

at least two reawardly swept, forward wings extending both laterally outward and rearward from opposite sides of the forward portion of said fuselage to define respective sweep angles, said at least two forward wings having respective outboard and inboard portions; and at least two forwardly swept, aft wings extending both laterally outward and forward from opposite sides of the rearward portion of said fuselage to define respective sweep angles during flight of the aerodynamic body, said at least two aft wings having respective outboard and inboard portions, wherein said inboard portions of said forward wings and said inboard portions of said aft wings define respective planes which are mutually coplanar, wherein said outboard portion of each aft wing is adjustably joined to said outboard portion of a respective forward wing to create at least two joined wings such that the aerodynamic body is a coplanar, joined wing aerodynamic body, wherein each wing defines an open region bounded by said forward and aft wings and said aerodynamic body, and wherein each of said forward and aft wings which are joined to create a joined wing is also slidably joined to said fuselage such that their ralative sweep angles are controllable to provide variable wing sweep.

2. An aerodynamic body according to claim 1 wherein each joined wing can be extended and can be closed in a scissors-like motion to provide said variable wing sweep.

3. A coplanar, joined wing, aerodynamic body comprising:

a lengthwise extending fuselage having a forward portion and a rearward portion;

at least two rearwardly swept forward wings extending both laterally outward and rearward from opposite sides of the forward portion of said fuselage, said at least two forward wings having respective outboard and inboard portions;

at least two forwardly swept, aft wings extending both laterally outward and forward from opposite sides of the rearward portion of said fuselage during flight of the aerodynamic body, said at least two aft wings having respective outboard and inboard portions, wherein said outboard portion of each aft wing is joined to said outboard portion of a respective forward wing to create a common wingtip; and at least two wing panels extending outboard from respective ones of the common wingtips, each being integral with and extending at the same sweep angle as a respective one of said rearwardly swept, forward wings;

wherein said inboard portions of said forward wings, said inboard portions of said aft wings and said wing panels define respective planes which are mutually coplanar.

4. An aerodynamic body according to claim 3 wherein a respective sweep angle is defined between each of said forward and aft wings, wherein said outboard portion of each aft wing is adjustably joined to said outboard portion of a respective forward wing to create a joined wing, and wherein at least one of said forward and aft wings which are joined to create said joined wing is also adjustably joined to said fuselage such that the sweep angle defined by the wing which is adjustably joined to said fuselage can be controllably varied to provide variable wing sweep.

5. An aerodynamic body according to claim 4 wherein both said forward wings and said aft wings are slidably connected to said fuselage such that each joined wing can be extended and can be closed in a scissors-like motion to provide said variable wing sweep.

6. An aerodynamic body according to claim 4 wherein said aft wing of each joined wing is fixedly connected to said fuselage, and wherein said forward wing of each joined wing is adjustably connected to said fuselage such that the sweep angle defined by said forward wing can be controllably varied.

7. An aerodynamic body according to claim 6 wherein said forward wing of each joined wing is slidably connected to said fuselage such that said joined wing can be slid forward relative to said fuselage in order to decrease the respective sweep angle and such that said joined wing can be slid rearward relative to said fuselage in order to increase the respective sweep angle.

* * * * *

UNITED STATES PATENT AND TRADEMARK OFFICE
CERTIFICATE OF CORRECTION

PATENT NO. : 5,899,410

DATED : May 4, 1999

INVENTOR(S) : Garrett

It is certified that error appears in the above-identified patent and that said Letters Patent is hereby corrected as shown below:

Title page, item [56], in the References Cited, U.S. PATENT DOCUMENTS, line 11, "Schmoldas et al." should read --Shmoldas et al.--.

In Sheet 1 of the Drawings, after "Fig. 1", "Fig. 2" and "Fig. 3", each occurrence, insert --(PRIOR ART)--.

Column 12, line 33, "ralative" should read --relative--.

Signed and Sealed this

Twelfth Day of October, 1999

*Attest:*

Q. TODD DICKINSON

*Attesting Officer*     *Acting Commissioner of Patents and Trademarks*